United States Patent Office 3,122,539
Patented Feb. 25, 1964

3,122,539
1,2-DIAMINO-1,2-DITHIOETHYLENES AND THEIR PREPARATION
Wallace Raymond Brasen, Wilmington, Del., assignor to E. I. du Pont de Nemours and Company, Wilmington, Del., a corporation of Delaware
No Drawing. Filed Jan. 30, 1961, Ser. No. 85,454
9 Claims. (Cl. 260—247.1)

This invention relates to tetra-substituted ethylenes. More particularly, it relates to tetra-substituted ethylenes having both nitrogen- and sulfur-containing substituents, and to a method for their preparation.

Substituted ethylenes having various types and numbers of substituents groups are known. For the most part these compounds are susceptible to free radical initiated polymerization, and a number are the basis for commercial polymers.

A new class of tetra-substituted ethylenes has now been discovered which have the property of inhibiting free radical polymerization. These novel tetra-substituted ethylenes are the 1,2-diamino-1,2-dithioethylenes having the formula

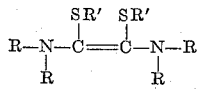

wherein the R's individually may be alike or different and are alkyl, alkenyl, cycloalkyl, cycloalkenyl, aryl, alkaryl, or aralkyl radicals or the two R's on the same nitrogen atom taken together are a divalent alkylene, oxaalkylene, or thiaalkylene radical, rings of five and six members being preferred; and the R's are alkali metal ions or are alkyl, alkenyl, cycloalkyl, cycloalkenyl, or aralkyl radicals in which the carbon atoms joining these radicals to the sulfur atom are aliphatic and each is joined to at least one hydrogen atom, with the proviso that when the carbon bonded to sulfur is a vinyl carbon, the carbon need not be bonded to a hydrogen.

The 1,2-diamino-1,2-dithioethylenes of this invention are prepared in two steps. The first step comprises reacting two gram atoms of an alkali metal, e.g., sodium, with one mole of a dithiooxamide of the formula

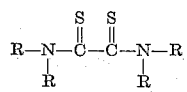

wherein the R's have the meanings specified above, in liquid ammonia. The reaction takes place very rapidly at the boiling point of liquid ammonia. The amount of liquid ammonia to be used is not critical as it serves merely as a reaction medium. Good results are obtained when an amount of ammonia is used which provides a workable dispersion of the reactants and the reaction products. The alkali metal can be added to the mixture of the dithiooxamide and liquid ammonia, or the dithiooxamide can be added to a solution of the alkali metal in liquid ammonia, either procedure being equally satisfactory. Satisfactory results are obtained when liquid ammonia is the sole reaction medium. However, any inert liquid that remains liquid at the temperature of reaction can be used as an additional reaction medium if desired. Among the inert liquids that can be used are diethyl ether, tetrahydrofuran and toluene.

The resulting alkali metal dimercaptides, i.e., the compounds of the general formula given above wherein the R''s are alkali metals, can be isolated by evaporation of the liquid ammonia (and any other inert solvent which may have been employed) from the reaction mixture. It is not necessary, however, to isolate the alkali metal dimercaptide from the reaction mixture of the first step before carrying out the second step of this invention.

In the second step, the alkali metal dimercaptide, obtained as described above and suspended in liquid ammonia, with or without an inert diluent, e.g., diethyl ether, is reacted with a hydrocarbyl halide, e.g., chloride, bromide or iodide, in which the carbon of the hydrocarbyl radical joined to the halogen is an aliphatic carbon which is also joined to at least one hydrogen atom (1–3 hydrogen atoms), i.e., a primary or secondary, hydrocarbyl halide, or a vinyl halide. Thus, the hydrocarbyl halides that are operable in this process include the primary and secondary alkyl, cycloalkyl, alkenyl, cycloalkenyl, and aralkyl chlorides, bromides and iodides. The hydrocarbyl halide is used in amount of at least two moles per mole of the dimercaptide. Reaction takes place within an hour at the boiling point of liquid ammonia. Lower temperatures ranging down to the freezing point of ammonia (−78° C.), can also be used. Similarly, higher temperatures can be used in this step but they require the use of a closed reaction vessel capable of withstanding the pressure developed by the reaction mixture of the operating temperature employed. Reaction times longer than one hour can be employed, but these are generally not necessary.

The 1,2-diamino-1,2-dihydrocarbylthioethylene can be isolated from the reaction mixture in various ways. In one method the liquid ammonia and any other inert reaction medium is evaporated from the mixture and the residue is treated with water to dissolve inorganic salts that are formed in the reaction. The residue is then fractionally distilled if it is a liquid or it is crystallized from a suitable solvent if it is a solid. In another method, water is added directly to the reaction mixture to dissolve the inorganic salts and an organic solvent is used to extract the 1,2-diamino-1,2-dihydrocarbylthioethylene which is then isolated by fractional distillation or by crystallization, depending on the particular composition of the product.

The dithiooxamides used as starting materials in the process of this invention can be prepared by reaction of acetylene with sulfur and the appropriate secondary amine under anhydrous conditions at a temperature between 80° and 300° C. in accordance with the following equation:

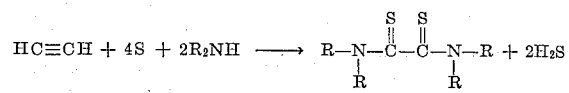

This process is described in greater detail in U.S. Patents 2,525,075 and 2,525,416. The hydrocarbyl halides employed in the process of this invention can be any of those commercially available or that can be made by conventional methods.

The products and process of this invention are illustrated in further detail by the following examples in which the proportions of ingredients are expressed in parts by weight unless otherwise specified.

EXAMPLE I

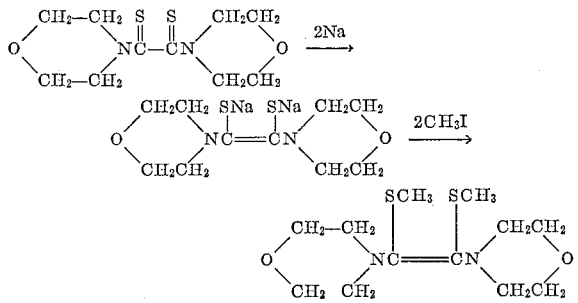

A reaction vessel fitted with a mechanical stirrer is charged with 6.5 parts of N,N,N',N'-bis(3-oxapentamethylene)-dithiooxamide and 250 parts of liquid ammonia. After adding 70 parts of diethyl ether, 1.15 parts of sodium is added in small pieces. The yellow-green suspension obtained is stirred for 0.5 hour and then 16 parts of methyl iodide is added rapidly. After the addition of the methyl iodide is completed, the reaction mixture is stirred for 0.5 hour and then 140 parts of diethyl ether is added. The reaction mixture is warmed on a water bath to remove remaining ammonia by distillation. An equal volume of water is then added to the suspension, the ether layer is separated, dried over anhydrous sodium sulfate and the ether is evaporated. The solid which remains is recrystallized from methanol and there is obtained 5.4 parts (73% of theory) of 1,2-dimorpholino-1,2-dimethylthioethylene, M.P. 81.8–84° C.

*Analysis.*—Calc'd for $C_{12}H_{22}O_2N_2S_2$: C, 49.63%; H, 7.64%; N, 9.65%; S, 22.07%; M.W., 290. Found: C, 49.25%, 48.97%; H, 7.73%, 7.68%; N, 9.52%, 9.57%; S, 21.80%, 21.82%; M.W., 285, 286.

The infrared absorption spectrum obtained for this product is consistent with the structure indicated above.

EXAMPLE II

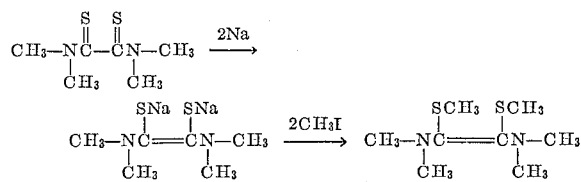

Following the procedure described in Example I, 22 parts of N,N,N',N'-tetramethyldithiooxamide is reacted with 6 parts of sodium in liquid ammonia and the resulting dimercaptide is reacted with 43 parts of methyl iodide and there is obtained 21.8 parts (84% of theory) of 1,2-bis(dimethylamino)-1,2-dimethylthioethylene. This product is a colorless liquid boiling at 75° C./1 mm. and having a refractive index, $n_D^{25}$, of 1.5545.

*Analysis.*—Calc'd for $C_8H_{18}N_2S_2$: C, 46.55%; H, 8.79%; N, 13.56%; S, 31.08%; M.W., 206. Found: C, 47.56%, 47.27%; H, 9.07%, 9.08%; N, 13.17%, 13.37%; S, 32.45%, 32.74%; M.W., 191, 191.

The infrared absorption spectrum obtained on this product is consistent with the structure indicated above.

EXAMPLE III

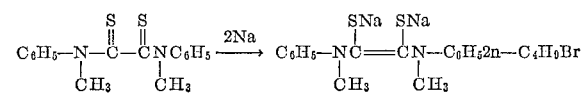

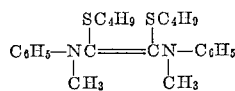

A reaction vessel fitted with a mechanical stirrer is charged with a solution of 4.6 parts of sodium in 500 parts of liquid ammonia. To this solution is then added 30 parts of N,N'-dimethyl-N,N'-diphenyl-dithiooxamide. The reaction mixture is stirred for 30 minutes and then 30 parts of n-butyl bromide is added and stirring is continued until the ammonia has evaporated from the reaction mixture, about 3 hours being required. Water is added to the residue to dissolve inorganic salts and the organic residue is crystallized from about 40 parts of methanol. There is obtained 25 parts of 1,2-bis(N-methyl-N-phenylamino)-1,2-bis-thio-n-butylethylene.

*Analysis.*—Calc'd for $C_{26}H_{34}N_2S_2$: S, 15.47%. Found: S, 15.73%, 15.60%.

EXAMPLE IV

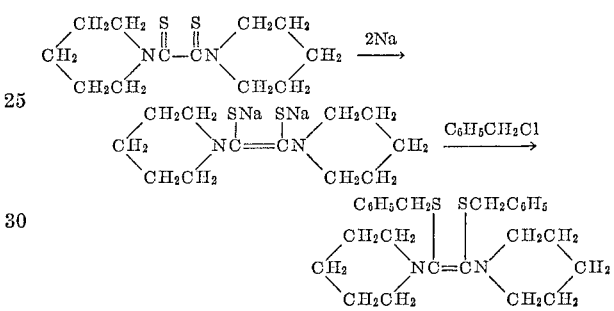

A suspension of 25.6 parts of N,N,N',N'-bis-(pentamethylene)-oxamide in 350 parts of liquid ammonia is stirred while 4.6 parts of sodium is added. The resulting white suspension is stirred for 0.5 hour and then a solution of 28.4 parts of benzyl chloride in an equal volume of diethyl ether is added rapidly. After stirring the reaction mixture for 1 hour, 140 parts of diethyl ether is added to the suspension and the remaining ammonia is evaporated by means of a hot water bath. The residual ether suspension is treated with 200 parts of water and the two-phase system is filtered. Recrystallization of the solid product from about 60 parts of ethanol yields 25 parts of 1,2-dipiperidyl-1,2-dibenzylthioethylene, M.P. 93.5–94.5° C.

*Analysis.*—Calc'd for $C_{26}H_{34}N_2S_2$: S, 14.62%. Found: S, 14.66%, 14.83%.

The examples have illustrated the process and products of this invention by specific reference to the preparation of certain 1,2-diamino-1,2-dithioethylenes; however, this invention includes any diaminodithioethylene of general formula

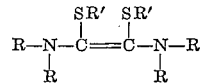

wherein the R's and R' 's have the meanings given hereinbefore. A preferred group of the products of this invention comprises the diaminodithioethylenes of the above formula wherein the R's individually are alkyl, alkenyl, cycloalkyl, cycloalkenyl, aryl, alkaryl, and aralkyl having up to 12 carbon atoms, or both R's on each of the two nitrogens taken together are alkylene, oxaalkylene, or thiaalkylene radicals having 2 to 12 carbon atoms, and the R' 's are alkyl, alkenyl, cycloalkyl, cycloalkenyl or aralkyl of up to 12 carbon atoms. Thus when the R's on each of the nitrogens are taken together, they form a ring with the intervening nitrogen. In addition to the products illustrated in the examples other 1,2-diamino-1,2-dithioethylenes of this invention are listed below in Table I, together with the specific reactants from which they are prepared.

Table I

| Reactants | | | Products |
|---|---|---|---|
| Dithiooxamide | Alkali Metal | Hydrocarbon Halide | |
| N,N,N',N'-tetraethyldithiooxamide | Potassium | Ethyl bromide | 1,2-bis(diethylamino)-1,2-diethylthioethylene. |
| N,N,N',N'-tetracyclohexyldithiooxamide | Lithium | Cyclohexyl chloride | 1,2-bis(dicyclohexylamino)-1,2-dicyclohexylthioethylene. |
| N,N'-dimethyl-N,N'-didodecyldithiooxamide | Sodium | n-Propyl iodide | 1,2-bis(methyldodecylamino)-1,2-di-n-propylthioethylene. |
| N,N,N',N'-tetravinyldithiooxamide | Cesium | n-Dodecyl bromide | 1,2-bis(divinylamino)-1,2-didodecylthioethylene. |
| N,N,N',N'-tetra-o-tolyldithiooxamide | Sodium | Cyclobutyl chloride | 1,2-bis(di-o-toluidino)-1,2-dicyclo-butyl-thioethylene. |
| N,N,N',N'-tetrabenzyldithiooxamide | Potassium | n-Hexyl iodide | 1,2-bis(dibenzylamino)-1,2-di-n-hexylthioethylene. |
| N,N'-dimethyl-N,N'-diethyldithiooxamide | Lithium | α-Phenylethyl chloride | 1,2-bis(methylethylamino)-1,2-di(α-phenylethylthio)-ethylene. |
| N,N,N',N'-tetraisobutyldithiooxamide | Rubidium | Allyl chloride | 1,2-bis(diisobutylamino)-1,2-diallyl-thioethylene. |
| N,N'-dimethyl-N,N'-di-α-naphthyldithiooxamide | Sodium | Isopropyl bromide | 1,2-bis(methyl α-naphthylamino)-1,2-diisopropylthioethylene. |
| N,N,N',N'-bis-tetramethylenedithiooxamide | Potassium | n-Octyl-chloride | 1,2-dipyrrolidyl-1,2-di-n-octylthioethylene. |
| N,N,N',N'-bis-3-thiapentamethylene-dithiooxamide | Sodium | n-Butyl chloride | 1,2-di(4-thiomorpholyl)-1,2-di-n-butylthio-ethylene. |
| N,N,N',N'-tetramethyldithiooxamide | do | 1-Cyclobutenyl chloride | 1,2-bis(diethylamino)-1,2-di(1-cyclo-butenyl-thio)ethylene. |
| N,N'-di(1-cyclohexenyl)-N,N'-dimethyl-dithiooxamide | do | Methyl iodide | 1,2-bis(1-cyclohexenyl-methylamino)-1,2-dimethylthioethylene. |

The diaminodithioethylenes of this invention are useful in a wide variety of applications. They are useful as antioxidants and as odorants. In the latter application, they are particularly useful as denaturants for ethyl alcohol.

The products of this invention are also useful as polymerization inhibitors. More specifically, they are effective inhibitors of the polymerization of ethylenically unsaturated monomers that can be polymerized by free radical initiation. For example, freshly distilled samples of vinyl acetate containing 0.1% by weight of benzoyl peroxide and 0.5% by weight of each of the diaminodialkylthioethylenes of Examples I–IV contain no polymer after being heated at 75° C. for 1 hour. A control in which the diaminodialkylthioethylene is omitted is 45% polymerized under the same conditions. Similarly, freshly distilled samples of vinyl acetate containing 0.1% α,α'-azodiisobutyronitrile, and 0.5% by weight of the diaminodialkylthioethylenes of Examples I–IV polymerize less than 5% when heated for 1 hour at 75° C. When the diaminodialkylthioethylene is omitted, the composition is 55% polymerized under the same conditions. For the purpose of comparison, freshly distilled vinyl acetate to which no initiator or inhibitor has been added, contains no polymer after being heated at 75° C. for two hours.

The alkali metal dimercaptides of the 1,2-diaminoethylenes are likewise useful as polymerization inhibitors, especially as inhibitors of the polymerization of water-soluble vinyl monomers such as acrylic acid.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

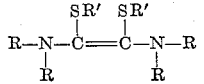

wherein when R is taken individually, R is a hydrocarbyl group selected from the class consisting of
  alkyl of up to 12 carbon atoms,
  alkenyl of up to 12 carbon atoms,
  cycloalkyl of from 3 to 6 carbon atoms,
  cycloalkenyl of from 3 to 6 carbon atoms,
  aryl of from 6 to 12 carbon atoms,
  alkaryl of from 7 to 12 carbon atoms, and
  aralkyl of from 7 to 12 carbon atoms;

and when R is taken together with the other R attached to the same nitrogen, the two R's form a divalent group of from 2–12 carbon atoms selected from the class consisting of
  alkylene,
  oxaalkylene, and
  thiaalkylene, and R' is free of substituents and is selected from the class consisting of
  alkali metal ions,
  alkyl of up to 12 carbon atoms,
  alkenyl of up to 12 carbon atoms,
  cycloalkyl of from 3 to 6 carbon atoms,
  cycloalkenyl of from 3 to 6 carbon atoms, and
  aralkyl of from 7 to 12 carbon atoms, in which the carbon atom bonded to sulfur is selected from the class consisting of
  an aliphatic saturated carbon bonded to at least one hydrogen, and
  a vinyl carbon.

2. A compound of the formula

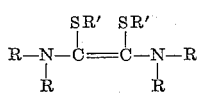

wherein R is a hydrocarbyl group selected from the class consisting of
  alkyl of up to 12 carbon atoms,
  alkenyl of up to 12 carbon atoms,
  cycloalkyl of from 3 to 6 carbon atoms,
  cycloalkenyl of from 3 to 6 carbon atoms,
  aryl of from 6 to 12 carbon atoms, alkaryl of from 7 to 12 carbon atoms, and
aralkyl of from 7 to 12 carbon atoms,
and R' is free of substituents and is selected from the class consisting of
alkali metal ions,
alkyl of up to 12 carbon atoms,
alkenyl of up to 12 carbon atoms,
cycloalkyl of from 3 to 6 carbon atoms,
cycloalkenyl of from 3 to 6 carbon atoms, and
aralkyl of from 7 to 12 carbon atoms,
wherein the carbon atom bonded to sulfur is an aliphatic carbon bonded to at least one hydrogen.

3. A compound of the formula

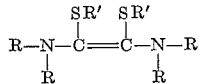

wherein R and R' are lower alkyl and the carbon bonded to sulfur is bonded to at least one hydrogen.

4. 1,2-dimorpholino-1,2-dimethylthioethylene.
5. 1,2-bis(dimethylamino)-1,2-dimethylthioethylene.
6. 1,2 - bis(N - methyl - N-phenylamino)-1,2-bis-thio-n-butylethylene.
7. 1,2-dipiperidyl-1,2-dibenzylthioethylene.

8. A process for the formation of compounds of the formula

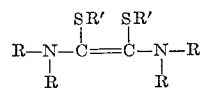

wherein when R is taken individually, R is a hydrocarbyl group selected from the class consisting of
alkyl of up to 12 carbon atoms,
alkenyl of up to 12 carbon atoms,
cycloalkyl of from 3 to 6 carbon atoms,
cycloalkenyl of from 3 to 6 carbon atoms,
aryl of from 6 to 12 carbon atoms,
alkaryl of from 7 to 12 carbon atoms, and
aralkyl of from 7 to 12 carbon atoms,
and when R is taken together with the other R attached to the same nitrogen, the two R's form a divalent group of from 2–12 carbon atoms selected from the class consisting of
alkylene,
oxaalkylene, and
thiaalkylene,
and R' is free of substituents and is selected from the class consisting of
alkali metal ions,
alkyl of up to 12 carbon atoms,
alkenyl of up to 12 carbon atoms,
cycloalkyl of from 3 to 6 carbon atoms,
cycloalkenyl of from 3 to 6 carbon atoms, and
aralkyl of from 7 to 12 carbon atoms,
in which the carbon atom bonded to sulfur is selected from the class consisting of
an aliphatic saturated carbon bonded to at least one hydrogen, and
a vinyl carbon,
which comprises treating a dithiooxamide of the formula

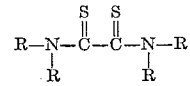

wherein the R's have the same meaning as above, with approximately two atoms of an alkali metal in the presence of liquid ammonia; treating the resulting alkali metal dimercaptide with a hydrocarbyl halide selected from the class consisting of
alkyl halides of up to 12 carbon atoms,
alkenyl halides of up to 12 carbon atoms,
cycloalkyl halides of from 3 to 6 carbon atoms,
cycloalkenyl halides of from 3 to 6 carbon atoms, and
aralkyl halides of from 7 to 12 carbon atoms,
in which the carbon attached to the halogen is selected from the group consisting of
an aliphatic saturated carbon bonded to at least one hydrogen, and
a vinyl carbon,
the halogen of said halide having an atomic number of from 17 to 53, inclusive; and isolating the resulting 1-2-diamino-1,2-dithioethylene.

9. Process for the formation of compounds of the formula

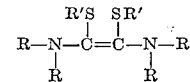

wherein R and R' are lower alkyl and the carbon bonded to sulfur is bonded to at least one hydrogen, which comprises treating dithiooxamide of the formula

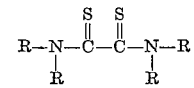

wherein the R's have the same meaning as above, with approximately two atoms of sodium in the presence of liquid ammonia; treating the resulting alkali metal dimercaptide with a lower alkyl halide in which the carbon attached to halogen is bonded to at least one hydrogen, the halogen of said halide having an atomic number from 17 to 53, inclusive; and isolating the resulting 1,2-diamino-1,2-dithioethylene.

No references cited.